Figure 1:
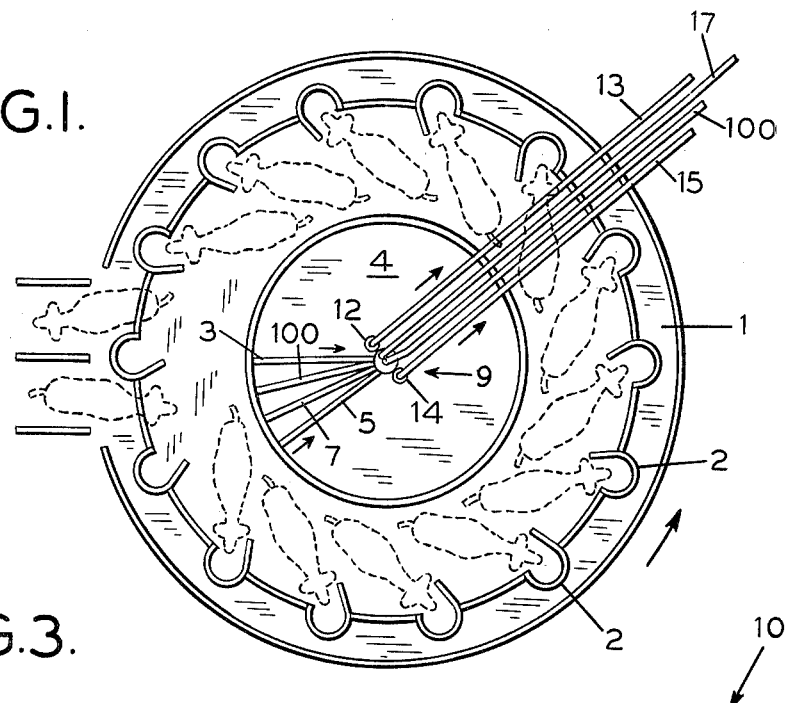

United States Patent [19]

DuBois

[11] 4,098,526

[45] Jul. 4, 1978

[54] ROTARY CONNECTING DEVICE

[75] Inventor: Donald E. DuBois, Ashokan, N.Y.

[73] Assignee: The De Laval Separator Company, Poughkeepsi, N.Y.

[21] Appl. No.: 694,052

[22] Filed: Jun. 7, 1976

[51] Int. Cl.² .............................................. F16L 55/00
[52] U.S. Cl. ................................... 285/119; 285/134; 119/14.04
[58] Field of Search ..................... 119/14.04; 285/119, 285/134, 136

[56] References Cited

U.S. PATENT DOCUMENTS

| 1,787,152 | 12/1930 | Hapgood | 119/14.04 |
| 2,305,259 | 12/1942 | Jeffers | 119/14.04 |
| 2,781,134 | 2/1957 | Weir et al. | 285/136 X |
| 2,964,340 | 12/1960 | Kinzie et al. | 285/134 X |
| 3,261,323 | 7/1966 | Steelhammer | 119/14.04 |
| 3,351,360 | 11/1967 | Faccou | 285/136 X |
| 3,477,746 | 11/1969 | Watson | 285/119 |
| 3,759,225 | 9/1973 | Galbraith | 119/14.04 |
| 3,851,663 | 12/1974 | Neuko | 119/14.04 X |

FOREIGN PATENT DOCUMENTS

| 1,398,596 | 6/1975 | United Kingdom | 119/14.04 |

*Primary Examiner*—Wayne L. Shedd
*Attorney, Agent, or Firm*—Davis, Hoxie, Faithfull & Hapgood

[57] ABSTRACT

A device for connecting fluid and electrical lines between a stationary structure and a rotary platform, more particularly a device for milk, vacuum, and electrical lines for a dairy rotary milking parlor.

6 Claims, 5 Drawing Figures

U.S. Patent   July 4, 1978   Sheet 1 of 2   4,098,526

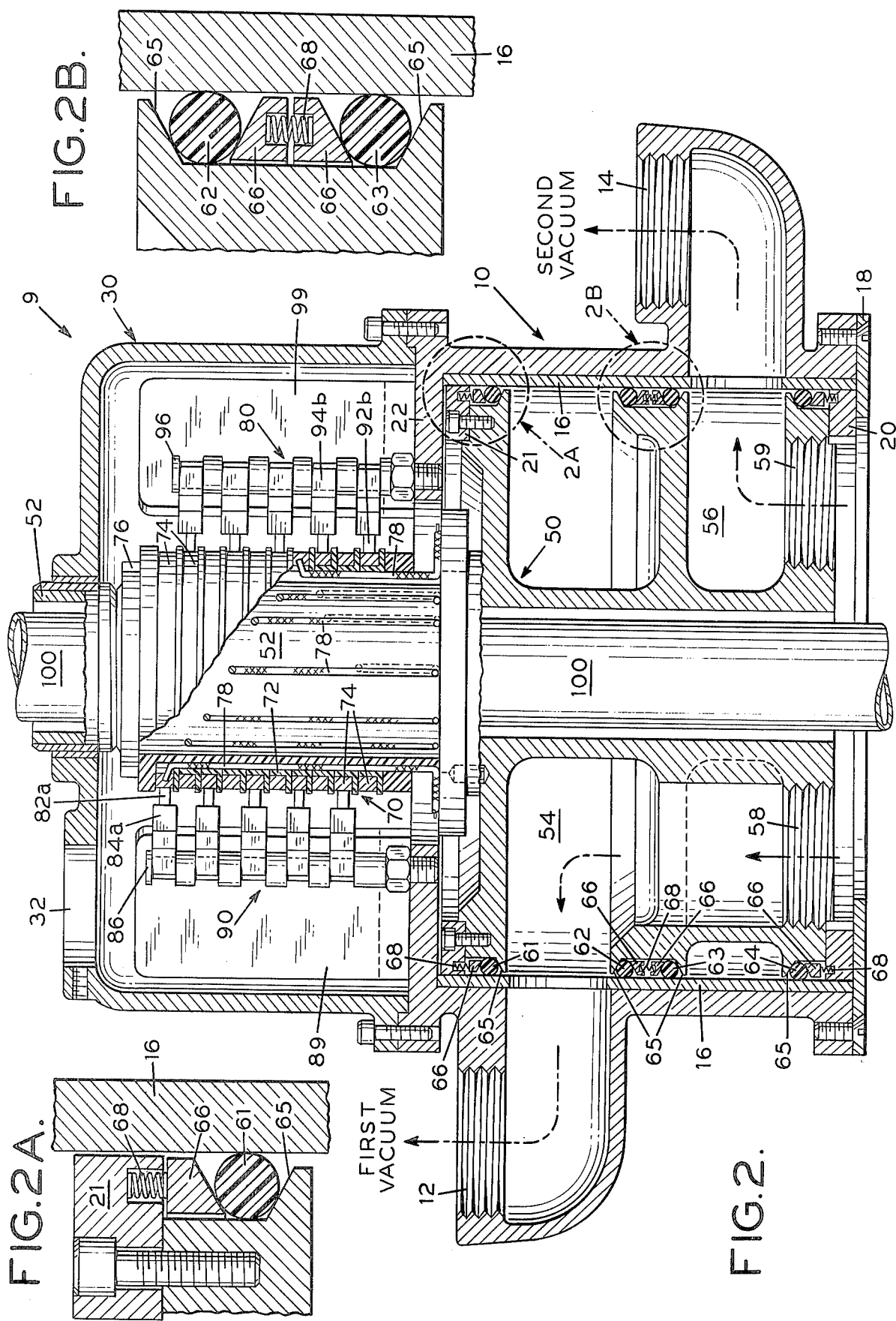

ROTARY CONNECTING DEVICE

The present invention is concerned with a rotary connecting device for a rotary milking parlor for a mechanized dairy farm. It is through this device that electrical power, vacuum and milk pass between the rotary platform of the parlor and the static structure of the building.

Rotary milking parlors have been employed by mechanized dairies since 1928. See, for example, Hapgood 1,787,152 and 1,959,716 and Luks 1,968,564. Modern mechanized milking employs a rotary milking parlor wherein cows are herded from the barns to an entrance gate which admits one cow at a time to individual stalls on an annular platform which rotates about a central pit where the dairymen control the operation. The cow puts her head into a manger automatically provided with a ration of feed. This movement of the cow causes a headlock to close. The teat cups of the milker are attached to the udder. The milker operates at a slow pulsation rate with low vacuum to stimulate milk flow. When the cow begins to deliver an adequate flow of milk, the milker automatically switches to a faster pulsation rate at a higher vacuum for extraction of the milk. When the milk flow stops or is interrupted, the milker switches back to the low vacuum and slow pulsation rate, but can switch back to milking again if the flow resumes. The milk from each cow is retained in a weigh jar for noting production, sampling, and inspection. Accepted milk is released from the weigh jar by the operator to be stored in a cooler. The cow leaves the platform through an exit gate after a complete revolution or milking cycle which takes about seven minutes.

Since the milking stations are on the rotating platform, rotating connections for electricity, high and low vacuum and milk are required. The connections must be rugged and durable to be reliable, are subject to continual dampness and an ammonia laden corrosive atmosphere, require frequent, thorough cleaning, must be highly resistant to electrical leakage which can injure or disturb the cows, must be high resistant to milk or vacuum leakage and to the ingress of foreign matter, and must meet stringent sanitary goals. The rotary connection device of the present invention meets all of these qualifications.

Figure 3:
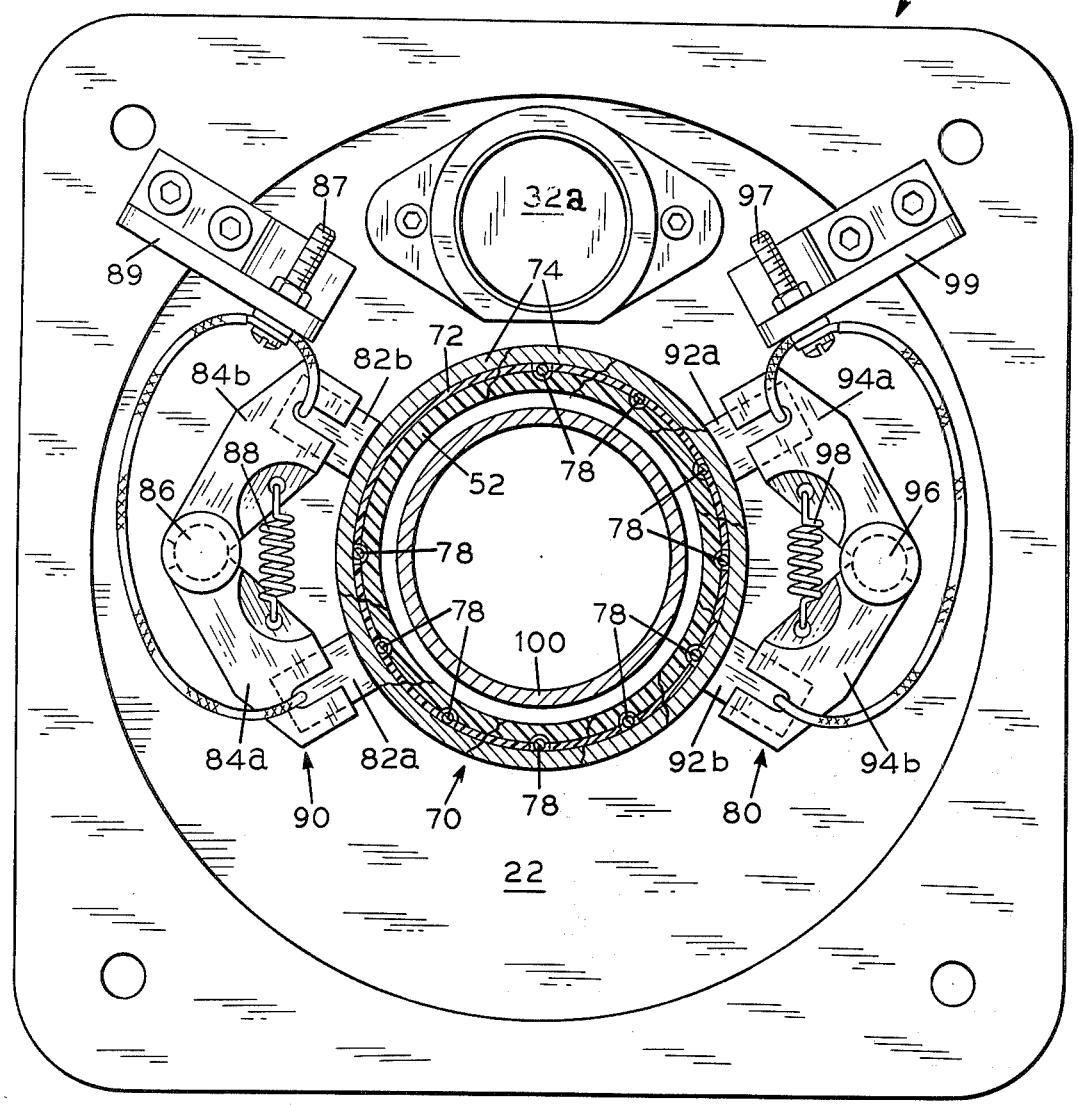

In the drawings:

FIG. 1 is a simplified schematic plan view of a rotary miling parlor employing the rotary connecting device of the present invention, FIG. 2 is an elevational view in partial section of the device of the present invention, FIGS. 2A and 2B are enlarged sectional views of portions of the seal structure, and FIG. 3 is a plan view of the device with the cover removed to permit illustration of interior components.

FIG. 1 is a simplified plan view of a rotary milking parlor showing cows entering, being milked, and leaving the annular rotating platform 1. During the ride the cows feed at mangers 2. The operators work the apparatus from central pit 4. The rotary connecting device 9 of the present invention is shown in the center. Static vacuum lines 13, 15 are connected to connector elbows 12, 14 integral with the device 9 and electrical static conduit 17 connects with the device. Revolvable vacuum lines 3, 5 and revolvable electrical conduit 7 connect the device to the rotary platform 1. A milk pipe 100 having appropriate swivel connections passes from the platform through the center of the device 9.

Referring now to FIG. 2, the rotary connecting device 9 of the present invention is shown in partial cross-section. The major components are the stationary casing 10, the stationary brush assemblies 80, 90, the casing cover 30, and the rotor assembly 50 which includes the slip ring assembly 70. The milk pipe 100 passes through the central axis of the device.

The stationary casing 10 is to be affixed to the ceiling of the building on the central axis of the rotary milking parlor. The casing 10 includes high and low vacuum pipe elbow connectors 12, 13 for connection to the stationary high and low vacuum lines 13, 15 of the building. The casing includes a stainless steel liner sleeve 16 against which the rotor seals 61–64 bear and includes an annular plate 18 against which the lower bearing ring 20 bears. The upper bearing ring 21 bears against the flange 22 which is integral with the casing 10.

The rotor assembly comprises a rotor member 50 having an axial tube 52 through which the milk pipe 100 passes and on which the slip ring assembly 70 is carried. Two separate generally annular chambers 54, 56 communicate with first and second (high and low) vacuum stationary connections 12, 14 and with first and second vacuum rotor ports 58, 59 respectively, to establish first vacuum passage 58, 54, 12 and a second vacuum passage 59, 56, 14. The first and second vacuum passages constitute independent fluid conduits which connect with the revolvable vacuum lines 3,5.

A plurality of circumferential polytetrafluoroethylene O-ring seals 61–64 serve as rotational journal bearings and to prevent vacuum leakage. As is shown in enlarged detail in FIGS. 2A and 2B, the O-ring seals 61–64 are in sliding sealing contact with the liner sleeve 16 of the stationary casing 10. The O-ring seals are biased radially outwardly by axial contraction of the V grooves in which each of the O-ring seals are retained. The V-grooves are defined between sloping chamfer surfaces 65 of the rotor and seal expander rings 66. Seal expander rings 66 are stainless steel annuli each having a conical sloped surface outwardly divergent to the slope of the rotor chamfer surfaces 65. The included angle between the sloping surfaces of the seal expander rings and the rotor is about 60°. A plurality of circumferentially spaced coil compression springs 68 apply axial force to the seal expander rings 66, axially contracting V-grooves and thereby forcing the O-ring seals 61–64 to expand radially against the liner sleeve 16 to establish seal integrity.

The four O-rings 61–64 bearing against the stainless steel liner sleeve 16 constitute the primary journal bearing for the rotor 50. If the rotor is subjected to excessive radial force, due for example to misalignment or lack of centering, the circumferential outer surfaces of porous bronze upper and lower bearing rings 20, 21 come into journal bearing contact with the liner sleeve 16 to serve as secondary bearings to help withstand the radial load. The end faces of bearing rings 20, 21 act as thrust bearings for vertical forces by bearing against annular plate 18 and flange 22, respectively.

The slip ring assembly 70 is carried by the upper portion of the rotor axial tube 52. The slip ring assembly comprises a sleeve 72 of insulation material overlying the tube 52. A stack of annular metal slip ring conductors 74 separated by further insulation are located on the sleeve 72 and are locked in place by a ring nut 76 threaded onto the axial tube 52. Each of the slip ring conductors 74 is electrically connected to an insulated wire conductor 78 located in an axial groove in sleeve 72 under the slip rings 74. These wires are bundled and lead downwardly through the rotor to emerge from a conduit connector (not shown) on the bottom of the rotor.

Brush assemblies 80 and 90, shown also in FIG. 3 comprise a plurality of carbon electrical contact brushes 82a, 82b and 92a, 92b spring biased against the appropriate slip rings 74 and retained in brush holder pairs 84a, 84b and 94a, 94b. The brush holder pairs are carried by posts 86, 96. The brush assemblies are arranged such that the brushes of assembly 80 contact every other slip ring 74 and those of assembly 90 contact the intervening slip rings. As is more clearly shown in FIG. 3, the brush assemblies 80 and 90 employ brush holder pairs 84a, 84b and 94a, 94b. Each pair of brush holders 84a and 84b or 94a and 94b is biased against the associated slip ring by a tension spring 88, 98 which pulls the brush holders and the associated brushes 82a, 82b and 92a, 92b toward each other in caliper fashion. Wire leads from each brush lead to a terminal 87, 97 on terminal boards, 89, 99 to which wires in the building static conduit 17 lead through conduit connection 32a and conduit outlet aperture 32 in the cover 30. Input and output wiring connections are made inside the sealed environment of the casing 10 and cover 30, thereby eliminating the need for leak prone electrical junction boxes on either side of the device.

Each wire entering the device through static conduit 17 completes an electrical connection through its associated brush and slip ring with a wire exiting from the bottom of the rotor 50.

In operation, the rotary connecting device 9 of the present invention is mounted on the central axis of and above a rotary milking parlor 1 with the stationary electrical power conduit 17 and high and low vacuum lines 13, 15 of the building connected to elbow connectors 12, 14 integral with the stationary casing 10 of the device. The electric conduit 7 and high and low vacuum lines 3, 5 of the rotary platform 10 are connected to the rotor 50 at the bottom of the device 9. A milk pipe 100 with appropriate swivel connections passes through the central tube 52 of the device. As the rotary platform turns, the electrical and vacuum lines extending between the platform and the device cause the rotor 50 to turn within the casin 10. O-rings 61–64 act as bearings and seals as the rotor turns within the liner sleeve 16 of the casing 10. Electrical circuit continuity is effected through brush assemblies 80, 90 and slip ring assembly 70.

We claim:

1. A rotary connecting device for establishing fluid connections between rotary and fixed structures comprising a stationary casing and a rotor, the casing having attachment means for plural separate stationary fluid conduits, the rotor having attachments for plural separate revolvable fluid conduits, said rotor having separate fluid chambers each in fluid communication with a stationary and a revolvable fluid conduit, polytetrafluoroethylene O-ring seals separating and sealing said chambers, said O-ring seals being biased radially outwardly to provide sliding, sealing bearing surfaces for journaling said rotor in said casing, said O-ring seals being positioned in V-grooves of the rotor, each of said grooves being defined on one side by a sloping surface of the rotor and on the other side by a divergent sloping surface on a seal expander ring, and means to axially bias said seal expander ring toward said rotor sloping surface to narrow the groove to force the O-ring radially outwardly of the groove.

2. The device of claim 1 wherein the means to axially bias said seal expander ring comprises compression springs which exert an axial force on said expander rings.

3. A rotary connecting device for establishing fluid and electrical connections between a rotary platform and a fixed structure, said device comprising a stationary casing enclosing a rotor, the casing having attachment means for a stationary electrical wiring conduit and for plural separate stationary fluid conduits, the rotor having attachments for a revolvable electrical conduit and plural separate revolvable fluid conduits, said rotor having separate fluid chambers each in fluid communication with a stationary and revolvable fluid conduit, polytetraflouroethylene O-ring seals separating and sealing said chambers, said O-ring seals being biased radially outwardly to provide sliding, sealing bearing surfaces for journaling said rotor in said casing, said O-ring seals being positioned in V-grooves of the rotor, each of said grooves being defined on one side by a sloping surface of the rotor and on the other side by a divergent sloping surface on a seal expander ring, and means to axially bias said seal expander ring toward said rotor sloping surface to narrow the groove to force the O-ring radially outwardly of the groove, said rotor including an axial passage for receiving a further fluid conduit which passes through the device along the central axis, said rotor including a plurality of electrical slip rings each being connectable to a wire of the revolvable electrical conduit, said casing including electrical brush assemblies for sliding electrical contract with said slip rings, the brushes being connectable to wires of said stationary wiring conduit.

4. The device of claim 3 wherein said brush assemblies for each slip ring comprise a pair of brush holders hinged at one end and provided with an electrical contact brush at the other, the holders of the pair being spring biased toward each other to apply a component of force to each brush in the radial direction of the slip ring.

5. The device of claim 4 wherein there are two brush assemblies, one on either side of the slip ring assembly, each brush assembly having a plurality of brush holder pairs.

6. The device of claim 5 wherein the brush holder pairs of one brush assembly contact every other slip ring and the brush holder pairs of the other brush assembly contact the intervening slip rings.

* * * * *